Figure 1:
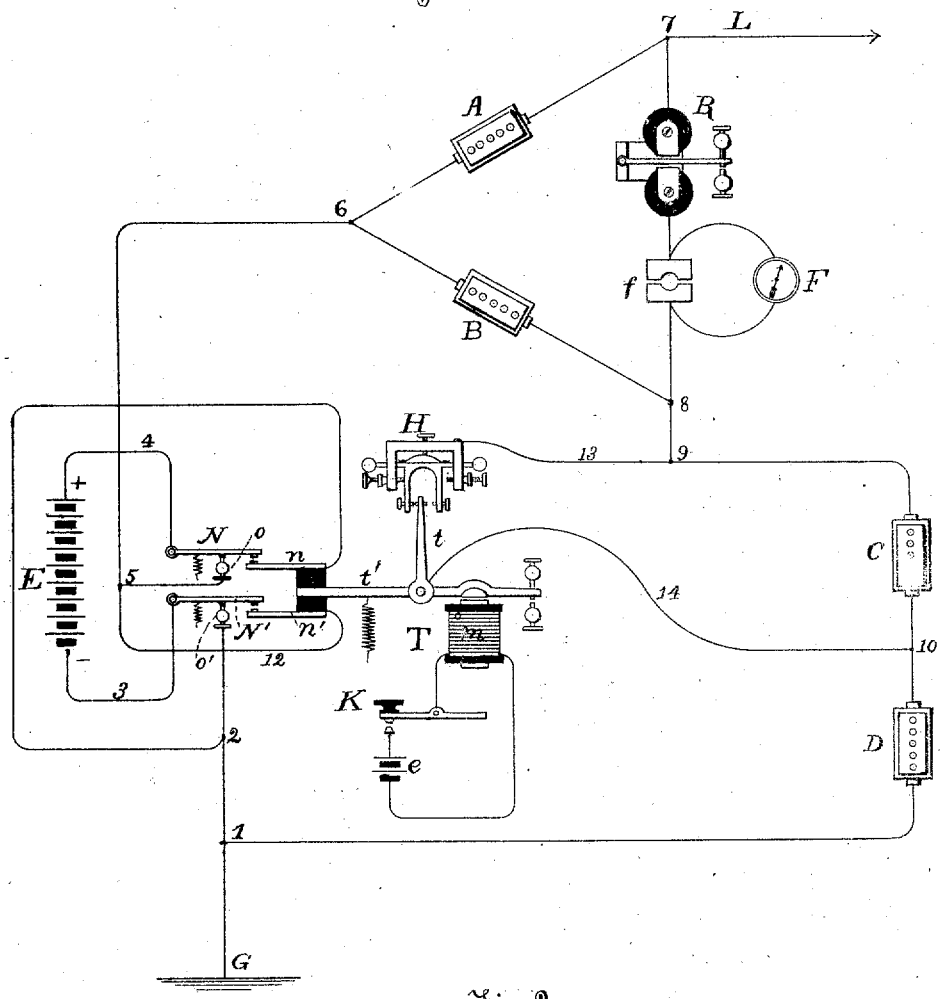

G. D'INFREVILLE.

Assignor to THE WESTERN UNION TELEGRAPH COMPANY.

DUPLEX TELEGRAPH.

No. 10,193. Reissued Sept. 5, 1882.

WITNESSES:

W. B. Vansize

Geo N. Breck.

INVENTOR

Georges d'Infreville

BY C. L. Buckingham

ATTORNEY

UNITED STATES PATENT OFFICE.

GEORGES D'INFREVILLE, OF NEW YORK, N. Y., ASSIGNOR TO THE WESTERN UNION TELEGRAPH COMPANY, OF SAME PLACE.

DUPLEX TELEGRAPH.

SPECIFICATION forming part of Reissued Letters Patent No. 10,193, dated September 5, 1882.

Original No. 238,094, dated February 22, 1881. Application for reissue filed April 17, 1882.

*To all whom it may concern:*

Be it known that I, GEORGES D'INFREVILLE, a citizen of the Republic of France, residing in the city and State of New York, have invented certain new and useful Improvements in Duplex Telegraphs, of which the following is a specification.

My invention relates to an improvement in the art or method of and in the apparatus for transmitting two telegraphic signals simultaneously from the opposite ends of one and the same line-wire.

The general object of the invention is to prevent false signals, which are ordinarily produced upon the receiving-instrument at the transmitting or home station by what are technically known as the "current of static charge" and the "current of static discharge."

It is a well-known fact that when an insulated telegraph-line of considerable length having its remote end connected with the earth is suddenly placed in connection with one pole of a battery whose opposite pole is connected with the earth a powerful current of electricity of momentary duration flows into the conductor, which is termed the "current of static charge;" and this phenomenon is due to the fact that the line will take a static charge first at a point next adjoining the battery-pole, and thence at one succeeding point after another along the entire length of line to the distant end. As each portion of length of the line stores an appreciable quantity of electricity in the course of its static charge, that part of the circuit in which a current actually flows increases in length, and at each instant terminates in that point which is receiving its static charge. At most, very little current will be set up in a line beyond a part which has not received such a charge. Thus when a battery is first placed to line its rapidly-increasing length of circuit is at first very short, and its resistance is but little in excess of the internal resistance of the battery and associate artificial resistances. The battery, therefore, at the first instant of connecting the line is as if upon a short circuit, and the electrical potential of points near the battery is much lower than when the circuit is increased to the entire length of the line. The electrical potential, therefore, at a point near the battery end of the line is variable and lowest, and but little above zero at the first instant of connecting the line to the battery, while the potential only becomes normal and greatest after the line is fully charged throughout its entire length. If the line has no capacity for receiving a static charge, the potential at a given point will remain constant from the instant of connecting the line and the battery until its removal.

The conditions requisite for the simultaneous transmission of signals in opposite directions are, first, the receiving-instrument at each station must remain at all times in connection with the line; second, signals transmitted by the key at either end of the line must produce no effect upon the receiving-instrument at the same station. The difficulties which tend to prevent the fulfillment of the latter condition especially arise principally from the effects of the currents of static charge and of static discharge.

In order to prevent the receiving-instrument at the home station from being affected by the outgoing currents from the home battery, which are designed to produce signals at the distant station, a device commonly known as an "artificial line" is usually employed, which is simply a derived circuit branching from the main line at a point near its junction with the transmitting-key, which goes directly to earth, or, what is the same thing, returns to the other pole of the home battery. This circuit is provided with artificial resistances or rheostats, by means of which its total resistance may be made equal to that of the main line. This arrangement enables the home receiving-instrument to be placed in a bridge-wire joining the main and artificial lines at points of equal potential, and which points are therefore neutral with reference to outgoing currents; or the receiving-instrument may be provided with two equal and opposing helices, one of which is included in the main and the other in the artificial line. It has, however, been found by experience that although the resistances of the main and artificial lines may be the same, their capacity for receiving a charge may be very different, the main line usually having a great capacity and the artificial line little or none. Thus at the moment of commencing the trans-

BEST AVAILABLE COP' mission of a signal, as stated in the foregoing, the electrical potential at the end of the bridge in the main line will be nearly zero, while at the other end of the bridge in the artificial line the potential will be high, whereupon a strong current will flow through the bridge from the point of high to the one of low potential, and thereby a false signal is produced upon the receiving-instrument; also, upon disconnecting a pole of a battery from line and connecting it to earth an instantaneous current of opposite polarity with flow to earth, a portion of which will pass through the bridge and cause a false signal.

The particular object of my invention is to establish an equality of electrical potential in the main and artificial lines at the two extremities of the bridge during the periods of static charge and discharge, as well as when the main line is charged throughout its entire length. If an equality of potential be maintained between the extremities of the bridge under all conditions of operation of the transmitting-instrument, no current will be set up in the bridge and no false signals will be produced upon the associated receiving-instrument; and to this end my invention consists in a method or means for decreasing the potential in the artificial line at the extremity of the bridge to such an extent that there shall be a substantial equality of potential at both extremities of the bridge at the instant the main line is receiving its static charge and during its static discharge. If one pole of a battery be removed from the line at the same instant an opposite one is connected thereto, the current of static discharge due to one will conspire with the current of static charge of the other to form what may be considered an augmented current of static charge.

Each reversal of the battery will be attended with such an enlarged current of static charge opposite in polarity to the preceding one; but, notwithstanding the fact that such successive currents are of opposite polarity, false signals may be prevented equally well in both cases, from the fact that a current of corresponding polarity in each instance is flowing over the artificial line, and however the potential of the main line at the bridge may be varied during the simultaneous static charge and discharge the potential of the artificial line at the other extremity of the bridge may be correspondingly changed to assimilate the two. If, however, the battery-poles were not reversed to line, but the line were placed from one battery-pole to earth, and vice versa, and no current of like polarity were flowing in the artificial line at the instant of static discharge, it is obvious that the potentials at the opposite ends of the bridge could not be assimilated, and false signals would therefore be produced.

The method for effecting an equality of potential at both ends of the bridge consists in diminishing the normal resistance of the artificial line momentarily and simultaneously with the act of charging the main line from either pole of the battery, whereby the potential in the artificial line at one end of the bridge may be assimilated to the decreased potential in the main line at the other extremity of the bridge. A portion of the artificial-line resistance is withdrawn by the same movement of the transmitter which serves to connect and disconnect the main and artificial line with a battery-pole, whereby the potential of the artificial line at the extremity of the bridge is automatically regulated upon connection and disconnection of a battery-pole and the main line. The transmitter at the very instant that one battery-pole is connected to and the opposite pole is disconnected from the line simultaneously closes an auxiliary circuit around any adjustable portion of the artificial-line resistance. The auxiliary circuit thus connected is retained closed momentarily, and while the main line is receiving its static charge from the battery-pole just connected, and during the simultaneous static discharge, due to the opposite pole, which is disconnected at the same time, when it is broken, and the auxiliary circuit remains broken until the pole of the battery, previously connected to line, is removed therefrom and the opposite pole is again connected, when it is again momentarily closed and retained closed during a period equal to that of the augmented static charge, and is then broken.

For the purpose of more clearly explaining my invention, I will briefly refer to the construction and mode of operation of one form of telegraph apparatus for the simultaneous transmission of signals in opposite directions over the same line, commonly known as a "duplex telegraph." I have selected for that purpose the well-known system or method of Maron, in which the receiving-instrument is placed in a bridge-wire, between the main and artificial lines, a method which admits of being conveniently compensated for the disturbing effects of the currents of charge and discharge in long lines, and which does not require a specially-constructed receiving-instrument, any ordinary apparatus, whether electro magnetic or chemical, being equally well adapted thereto. I prefer, however, to make use of a different transmitting apparatus from that devised by Maron in that alternate positive and negative currents are employed instead of currents exclusively of one polarity.

Figure 2:
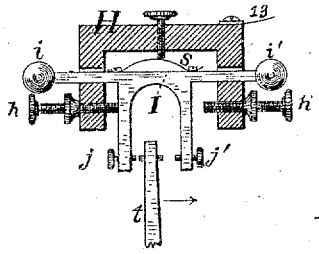

In the accompanying drawings, Figure 1 is a theoretical diagram, illustrating the application of my improved method to a duplex telegraph; and Fig. 2 represents certain details of the apparatus employed in carrying out the invention.

Referring to Fig. 1, T represents a transmitter, consisting of a lever, $t'$, provided at one end with an armature, which is acted upon by an electro-magnet, $m$, a local battery, $e$, and a transmitting-key, K, the arrangement and operation of all which are well understood, and therefore need not be particularly described.

BEST AVAILABLE COPY

Upon the armature $t'$ of the transmitter T are mounted two insulated contact-arms, $n$ $n'$. When the opposite arm of the transmitter is depressed by the action of key K and electro-magnet $m$ the arms $n$ $n'$ are raised and lift the contact-levers N N' from the respective contact-stops $o$ $o'$, upon which they normally rest, thereby simultaneously forming an electric connection between N and $n$, and also between N' and $n'$, and at the same moment breaking the previously-existing connection between N and $o$ and N' and $o'$, the effect of which is to reverse the polarity of the main battery E with reference to the line, as will be understood by tracing the connections. In the normal position of rest, with the key K open, the path of the current is from the earth at G by way of 1 and 2 to the point $o'$; thence through the contact-lever N' and wire 3 to the negative pole of the battery E; thence from the positive pole of the battery by wire 4, contact-lever N, point $o$, and wire 5 to the point 6, where the main and artificial lines separate, the main line going through the rheostat A to the point 7, and thence by the line-wire L to the distant station. The artificial line diverging from the point 6 passes by the rheostat B to the point 8, thence to the point 9 through rheostats C and D to the point 1, where it connects with the earth or the opposite pole of the battery.

It is obvious that if the amount of resistance in rheostats C and D is made exactly equal to that of the line-wire L leading to the distant station, the main and artificial lines having each the same capacity for receiving a static charge, no current will pass through the bridge-wire 7 and 8 which is connected from the main to the artificial line, and in which is placed the home receiving-instrument R, provided, however, that resistances A and B are equal. Moreover, according to the well-known laws of electrical action, the result will be the same if the proportion of the rheostat A to the line L is the same as that of the rheostat B to the resistances C and D taken together in the artificial line. With such a proportion of resistance, and an equality of capacity for storing static charge, the points 7 and 8 would at all times be of equal electrical potential upon connecting to or disconnecting either pole of battery E from line. It is well ascertained, however, that the artificial line, consisting of a conductor having great resistance and little metallic surface, between which and the earth inductive reaction can occur, has little or no capacity for receiving a static charge. The main line, on the contrary, has a large static capacity, and when the pole of a battery is connected thereto the battery, in respect to the main line, is as upon short circuit—that is, the current from either pole of the battery E, after flowing through resistance A, will be absorbed at one point after another along the main line as the line receives its static charge. Thus after connecting the battery E to the main line the point 7, before the line has received its static charge thereat, will be at an electrical potential of zero, while at the same time the potential at point 8 in the artificial line will have nearly attained its maximum potential, and therefore a current will flow from the point of higher potential, 8, toward the point of lower potential, 7; but as the main line will almost instantly receive its static charge throughout its whole length, the electrical potential at 7 will speedily rise to a maximum equal to the electrical potential of 8, when a current will cease to flow through the bridge.

When the apparatus is at rest, as hereinbefore described, a current of determinate polarity (in this case a positive current) flows continuously to line, and a signal is produced at a distant station by depressing the key K, which operates the transmitter and reverses the polarity of battery E without breaking its circuit; but at the moment of this reversal the line L, being charged with positive electricity, which has a strong affinity for the negative current which succeeds it, or, in other words, owing to the positive electricity already stored in the line in respect to the succeeding negative charge, the point 7 has a very low electrical potential, and consequently the initial negative charge tends to flow almost wholly toward the line L, not only through the resistance A, but also from point 6 through resistance B to point 8, and thence through the receiving-instrument R. Such current of charge due to the negative pole of the battery is a resultant current consisting, in the first place, of the static discharge accompanying the disconnection of the main line from the positive pole of the battery, and, secondly, of the current of static charge from the negative pole. The current of static discharge from the positive pole is in the same direction as the current of static charge from the negative pole, and both conspire to make what may be considered as an augmented current of static charge. In order to obviate this difficulty, I prefer to construct the artificial line in two sections, which sections are composed of separate adjustable rheostats C and D. I provide also an auxiliary circuit forming a shunt around the rheostat C, which consists of a wire, 13, leading from the point 9, and a wire, 14, from the point 10, which wires are connected to a circuit-closing device operated by the transmitter T. The transmitter acts to momentarily close said auxiliary or shunt circuit at the instant of the reversal of the current in the main or artificial lines; and whether from positive to negative or from negative to positive, it is obvious that inasmuch as the rheostats C and D, which constitute the artificial line, may be temporarily withdrawn and its total resistance reduced, the electrical potential at point 8 may be momentarily reduced to approximately correspond with the low potential at point 7 at and during the instant the line is receiving its charge.

The device by which the shunt is closed at the proper time will now be described.

Referring to Fig. 2, H is a metallic frame which is fixed in a position directly above the

BEST AVAILABLE COPY upright arm *t* of the transmitter, as best seen in Fig. 1. Within this frame slides loosely a metallic shuttle, I, upon which rests, with slight pressure, a friction-spring, *s*. The shuttle I is capable of a horizontal movement to and fro within the frame H, which motion is limited in each direction by adjustable screw-stops *h* and *h'*. Adjustable contact-points *j* and *j'* are mounted upon two arms projecting downward from the horizontal portion of the shuttle I and corresponding contact-points are placed upon the upright vibrating arm *t* of the transmitter T. The contact-points and stops hereinbefore referred to are so adjusted that the play of the shuttle I is somewhat greater than that of the arm *t* of the transmitter. The effect of this arrangement is that the movement of the arm *t* in each direction momentarily closes the circuit between itself and the shuttle I, which latter is in electrical connection with the frame H, and consequently with the wire 13. Thus, for example, in Fig. 2, if the arm *t* move to the right in the direction indicated by the arrow, it will strike against the contact-point *j'* and make electrical contact, after which the shuttle will move along still in contact with the arm until the end of arm *t* has completed its stroke, when, the stroke of shuttle I being greater than that of arm *t*, the inertia of the shuttle will carry it forward still farther in the same direction until it brings up against the stop *h'*; but since arm *t* is arrested before shuttle I strikes the stop *h'*, electric contact between wires 13 and 14 will be broken. The same action and the same effect are repeated in connection with the return movement of the arm.

It is obvious that by properly adjusting the stops *h h'* and the contact-points *j j'* the duration of the contact can be adjusted within the necessary limits. The stops *h h'* and contact-points *j j'* are relatively so adjusted that at the instant the pole-changing transmitter removes one battery-pole from line and connects another thereto the arm *t* will simultaneously come in contact with either *j* or *j'*, the contact between *t* and *j* or *j'* must continue during the greater portion of the time that the line is receiving the charge. When the line has received its static charge, or a greater portion thereof, and the electrical potential of point 7 has attained its maximum amount connection between *t* and *j* or *j'* must be broken. In order to increase the inertia of the shuttle, I prefer to mount suitable weights, *i* and *i'*, upon its extremities.

The galvanometer F, which may be thrown into the circuit of the bridge-wire by withdrawing a metallic plug from the commutator *f*, serves to indicate when the proper balance has been obtained, or, in other words, when the resistance in rheostat C is sufficient to cause a proper variation of potential at point 8 to compensate for the change of potential at point 7.

I do not desire to confine myself to the particular construction of duplex apparatus which I have shown and described, as many modifications may be employed by which the same results may be effected without departing from the spirit of my invention. For example, two separate batteries of opposite polarities, or even a single one with an ordinary circuit-preserving transmitter, may be employed. In the latter case, however, it would only be necessary to use one-half of the shunt-circuit-closing attachment to the transmitter which is represented in Fig. 2 of the drawings.

I claim as my invention—

1. The method, substantially as hereinbefore set forth, of counterbalancing the effects of the current of charge in a duplex telegraph system which consists in momentarily diminishing the normal resistance in the artificial line simultaneously with the act of charging the main line.

2. The combination, substantially as hereinbefore set forth, of a main line, an artificial line, and a key or transmitter provided with two sets of circuit-closers arranged to act simultaneously and including means, respectively, one to connect the battery with the main and artificial lines, and the other to temporarily close a normally-open shunt around a portion of the resistance in the artificial line.

3. The combination, substantially as hereinbefore set forth, of a rheostat normally constituting a portion of the artificial line, a normally-open shunt-circuit passing around said rheostat, and a circuit-closer for completing said shunt-circuit, which is attached to or operated simultaneously with the lever of the transmitter.

4. The combination, substantially as hereinbefore set forth, of the transmitter-arm, the reciprocating weighted shuttle moving with slight friction between adjustable stops, and by its inertia having a greater range of vibration than the transmitter-arm, and the contact-points upon the said shuttle facing the transmitter-arm.

5. The combination of a main line, the artificial line, a bridge connecting the main and artificial lines, a receiving-instrument placed in said bridge, a reversible main-line battery, a normally-open auxiliary circuit or branch, and a key or transmitting device provided with two independent sets of circuit-closers, one to reverse the main-line battery both on an up and down movement of the key, and the other to temporarily close said auxiliary circuit at the instant of each reversal of the battery, for the purpose of establishing an equality of potential at both ends of said bridge at and for an instant following each reversal of battery.

6. A key or transmitter provided with a main-line battery pole-changer and an independent circuit-closer for temporarily closing an auxiliary circuit at the instant of reversing the main-line battery both upon the to-and-fro movement of the transmitter, and means for retaining said auxilliary circuit closed, in the first instance upon connecting a battery-pole to line, and in the second instance upon disconnecting the same battery-pole from line.

7. In a telegraph-system for simultaneous transmission in opposite directions, the combination, at each station, of a main line, an artificial line, a bridge joining the main and artificial lines, a transmitting-key, and a normally-open auxiliary circuit which is temporarily closed by the key both upon the to-and-fro movement of said key during an instant after connecting a battery-pole to line, and again for an instant after disconnecting the same battery-pole from line, to establish an equality of potential at the opposite ends of said bridge at each reversal of the battery.

8. A transmitter or key provided with a main-battery-circuit closer and an independent-circuit closer arranged to temporarily close an auxiliary circuit at the instant of connecting a main-battery pole to line, and means to continue such connection only for an instant, and to again temporarily close the auxiliary circuit during the period of static discharge, and to disconnect the same pole from line.

9. A transmitter or key provided with a main-battery circuit-closer, an auxiliary circuit, and an independent circuit-closer therefor, operated by the key, and means whereby the auxiliary circuit is momentarily closed and then broken during the period of static charge upon the downward movement of the transmitter, and means whereby the auxiliary circuit is again momentarily closed and then broken during the period of static discharge upon the return or upward movement of the transmitter.

In testimony whereof I have hereunto subscribed my name this 8th day of April, A. D. 1882.

GEORGES D'INFREVILLE.

Witnesses:
W. B. VANSIZE,
WM. ARNOUX.